United States Patent
Mencacci

[15] 3,700,386
[45] Oct. 24, 1972

[54] APPARATUS FOR CANNING FISH

[72] Inventor: Samuel A. Mencacci, Saratoga, Calif.

[73] Assignee: International Machinery Corporation S.A., St. Nicklaas-Waas, Belgium

[22] Filed: Nov. 10, 1970

[21] Appl. No.: 88,429

[30] Foreign Application Priority Data

Nov. 12, 1969  Belgium........................49677

[52] U.S. Cl.....................53/123, 53/123, 53/124 D, 100/238, 141/81
[51] Int. Cl. ...........................................B65d 63/02
[58] Field of Search.......53/123, 124 D, 23; 100/238; 141/81

[56] References Cited

UNITED STATES PATENTS

| | | | |
|---|---|---|---|
| 2,926,095 | 2/1960 | Gorby | 53/123 X |
| 1,100,333 | 6/1914 | Steelman et al. | 100/238 X |

*Primary Examiner*—Travis S. McGehee
*Attorney*—F. W. Anderson, C. E. Tripp and A. J. Moore

[57] ABSTRACT

A fish can filling apparatus including a conveyor for advancing fish fillets past a rotary cutter which cuts the fish into segments and then advances the segments into a compression chamber. A piston then transfers the segments of fish against a forming surface corresponding in shape to a portion of the side wall of the can to be filled. Shaping knives are then closed to form part of the remainder of the fish segments into a shape corresponding to the shape of the remaining portion of the side walls of the can. A reciprocating piston then transfers the formed charge of fish into the open can, and when approaching the end of its transfer stroke and at the beginning of its return stroke, the piston is oscillated about its axis to minimize the tendency of the fish to stick to the piston and also to prevent flakes or chips of the fish from being pulled off the surface of the charge of fish.

7 Claims, 6 Drawing Figures

PATENTED OCT 24 1972

INVENTOR.
SAMUEL A. MENCACCI

BY C. E. Tripp -ATTY

A. J. Moore -AGENT

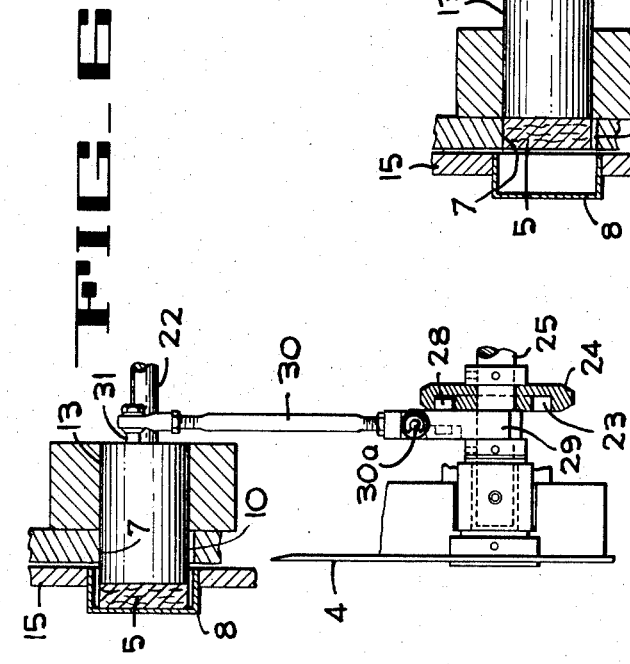
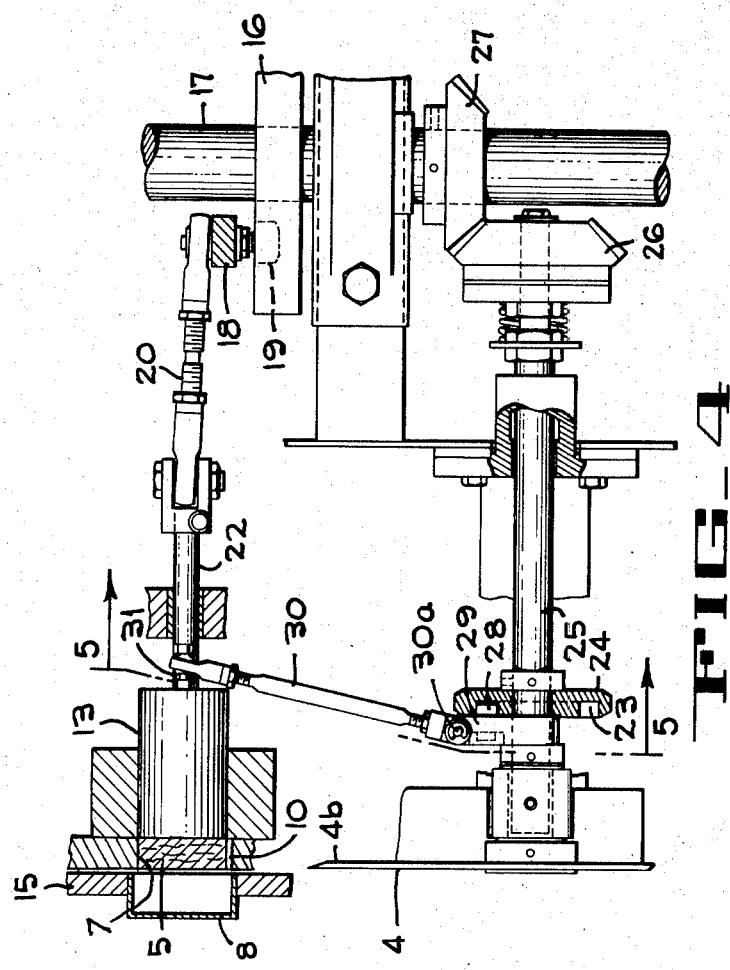

APPARATUS FOR CANNING FISH

CROSS-REFERENCE TO RELATED APPLICATIONS

The fish canning apparatus of the present invention defines an improvement of the apparatus disclosed in the copending U.S. application of Mencacci et al., Ser. No. 616,008 which was filed on Feb. 14, 1967, now abandoned and is assigned to the assignee of the present invention.

BACKGROUND OF THE INVENTION

1. Field of the Invention

This invention pertains to apparatus for canning fish and more particularly relates to an apparatus for filling cylindrical containers with chunk tuna or the like and for minimizing the tendency of the fish to adhere to the surfaces of the filling apparatus.

2. Description of the Prior Art

U.S. Pat. No. 2,926,095, issued to Gorby on Feb. 23, 1960, describes a method and apparatus for canning fish in which a formed charge of fish is displaced from a forming chamber into a container by means of a reciprocating piston.

It has been experienced with apparatus of this type that, due to the sticky nature of the raw fish as well as to the formation of a vacuum between the fish charge and the piston, flakes or chips of fish are often pulled loose from the free surface of the canned fish charge upon withdrawal of the piston. This imparts an unappealing appearance to the contents of the can when subsequently opened by the consumer. Although the quality of the fish might be excellent, it will psychologically be downgraded by the consumer due to its appearance. It will easily be understood that this is a serious drawback for the fish canning industry.

It has also been experienced that at times the fish charge adhered to the piston and was partially pulled out of the can upon withdrawal of the piston causing loss of the charge and possible jamming of the apparatus.

SUMMARY OF THE INVENTION

The fish canning apparatus of the present invention includes a conveyor that moves fish fillets into a rotary knife that cuts chunks of fish off of the fillet so that the chunks may be moved into a compression chamber. An extrusion piston in the compression chamber than moves the chunks laterally against a curved forming surface which with the aid of cooperating shaping knives forms the fish into can size charges. Each charge is then pushed into the associated can by a transfer piston, and the piston is oscillated about its own axis when approaching and leaving the transfer end of its stroke to minimize adhesion of the fish to the transfer piston due to suction and due to the sticky nature of the fish.

An object of the invention is to eliminate the above mentioned disadvantages by oscillating the transfer piston about its own axis as it is transferring a charge of fish into a container and immediately after the charge has been transferred.

BRIEF DESCRIPTION OF THE DRAWINGS

FIG. 4 is a horizontal section taken along lines 4—4 of FIG. 3.

FIG. 5 is a vertical section taken along lines 5—5 of FIG. 4.

FIG. 6 is a plan of the left portion of FIG. 4 with the transfer piston shown in its other extreme position.

DESCRIPTION OF THE PREFERRED EMBODIMENT

Figure 1:
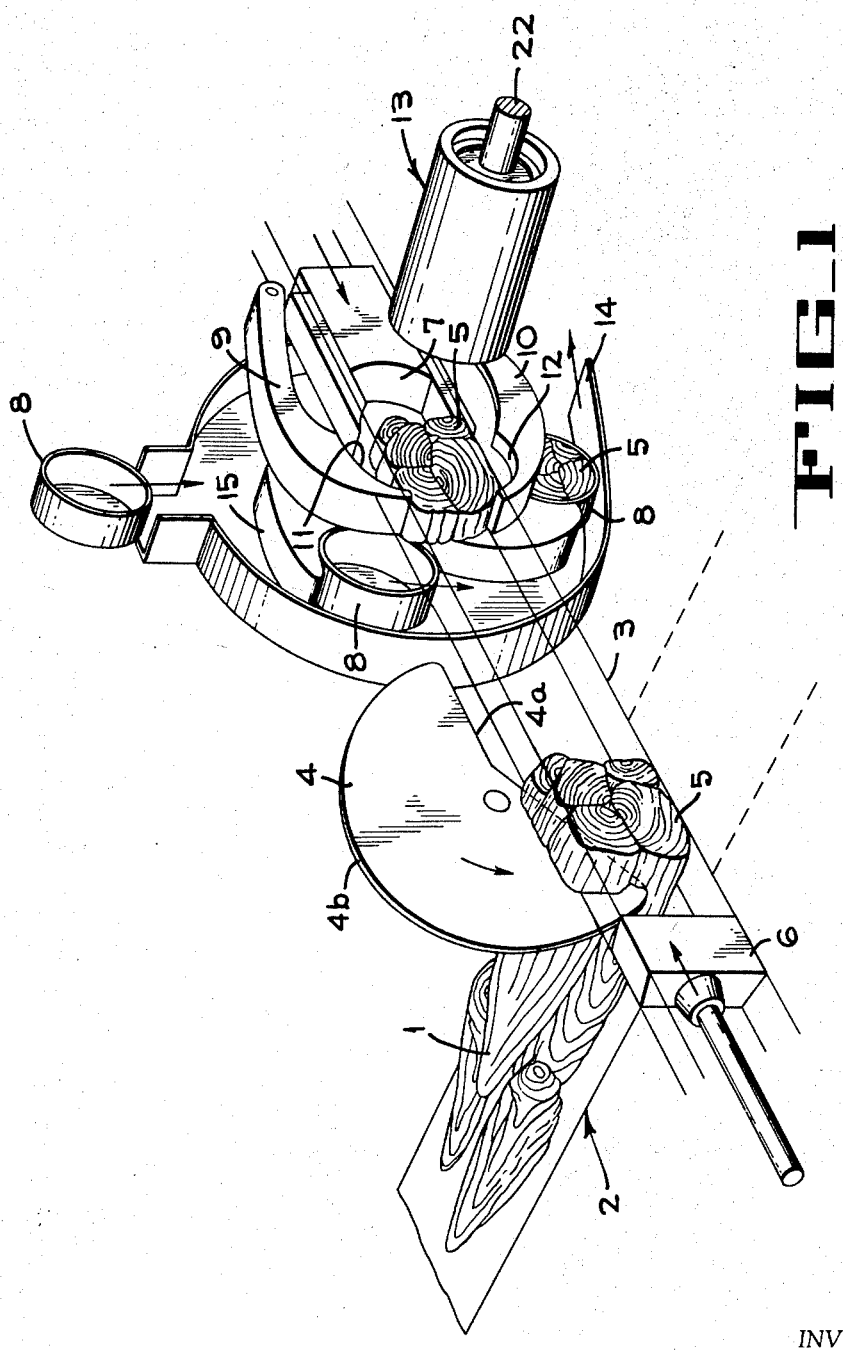
FIG. 1 is a schematic perspective showing the working principle of a fish canning apparatus to which the present invention may be applied.

The apparatus hereinafter described works substantially as follows: Fish fillets 1 (FIG. 1) are fed by an infeed mechanism 2 into a compression chamber 3, the excess of fish being cut off by rotary knife 4 provided with fish receiving relieved portion 4a and a large diameter cutting portion 4b which cuts the fish and temporarily shuts chamber 3 and the infeed side. The charge of fish 5 thus brought into the chamber 3 is then pushed by an extrusion piston 6 against a forming surface 7 corresponding to a portion of a side wall of a container or can 8. Subsequently, shaping knives 9 and 10 are brought toward each other, said knives each having profiled surfaces 11 and 12 respectively to form the remainder or a portion of the fish charge 5 into a shape corresponding to the complementary side wall of the can 8. The thus obtained fish cylinder or charge is pushed into the can 8 by a transfer piston 13, the filled can being discharged at 14 and an empty can being brought into alignment with the pusher 13 by a turret 15; the same cycle of operations as described hereinabove being repeated for each can.

Reference may be had to the aforementioned Mencacci et al. application if a more detailed description of the above components is desired.

Figure 2:
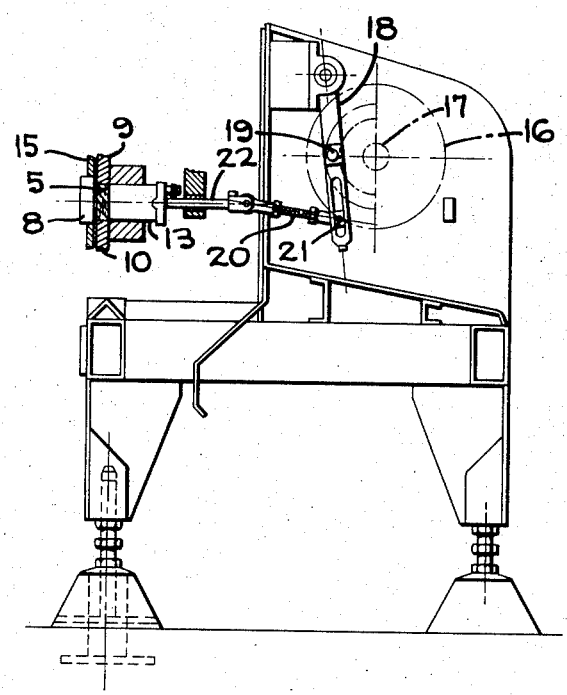
FIG. 2 is a schematic side elevation, partly in section, of part of an apparatus embodying the present invention and showing the drive means for the transfer piston.

The to and fro or reciprocatory linear motion of the piston 13 is imparted by a cam 16 (FIGS. 2, 3 and 4) mounted on a continuously driven cam shaft 17, via an oscillating lever 18 provided with a cam follower 19 and an adjustable rod 20. One extremity of the rod 20 is pivoted on a slide 21 carried by the lever 18 and the other extremity of the rod is pivotally connected to the extremity of a piston rod 22 of the piston 13.

Figure 3:
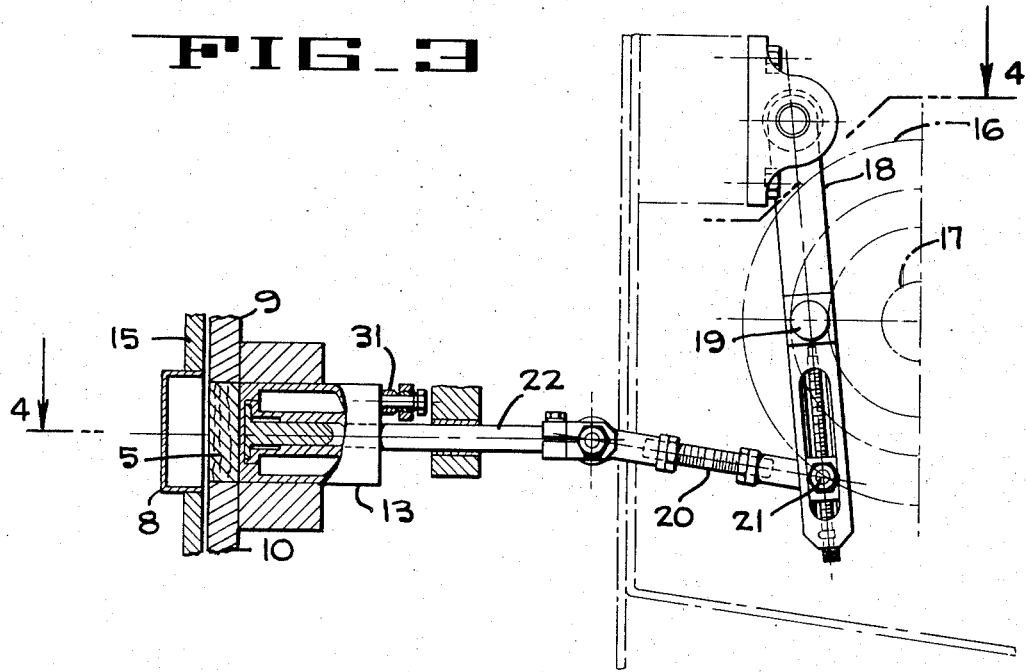
FIG. 3 is an enlarged side elevation of a portion of the apparatus of FIG 2.

The piston 13 is mounted for rotation on and about the axis of the rod 22 (FIG. 3). An oscillating motion is imparted to the piston about the rod 22 by a cam track 23 (FIGS. 4 and 5) provided in a disc 24 carried by a shaft 25 driven from the cam shaft 17 by conical gears 26 and 27. The cam track is followed by a roller 28 that is pivotally mounted on a rider 29 to which rod 30 is hinged at 30a, the other end of the rod 30 being connected by a swivel to a projection 31 of the back of piston 13 for pivotal motion about an axis parallel to the piston axis and about another axis that is perpendicular to the piston axis. This projection 31 is eccentrically mounted with respect to the rod 22.

The shape of cam track 23, as seen in FIG. 5, is shown as including a large circular portion 23a and a small eccentric portion 23b such that an oscillating motion is communicated to piston 13 during a relatively small portion of each revolution of shafts 25 and 17. The relative timing of cam track 23 and cam 16 is such that the piston 13 oscillates during the end of the transfer and the beginning of the subsequent withdrawal stroke. A relative sliding motion is thus imparted between the piston surface and the fish charge.

The above described structure for operating the transfer piston causes the piston to more readily pull free from the charge of fish and provides a flat appearing surface on the fish which is devoid of loose particles thereby greatly improving the appearance of the fish when the can is subsequently opened by the consumer.

Although the best mode contemplated for carrying out the present invention has been herein shown and described, it will be apparent that modification and variation may be made without departing from what is regarded to be the subject matter of the invention.

What I claim is:

1. Apparatus for canning fish of the type including a fish charge forming means and a formed fish charge transfer means to transfer said fish charge into a can comprising an axially displaceable piston, and means for driving said piston in an axial to and fro motion defining a transfer and withdrawal stroke, wherein the improvement comprises piston oscillating means for oscillating said piston around its axis, said piston oscillating means including means for oscillating said piston in a timed relationship to said axial piston motion such that said piston oscillates only during the end of the transfer and the beginning of a subsequent withdrawal stroke.

2. Improved apparatus for canning fish of the type including a fish charge forming means and a formed fish charge transfer means to transfer said fish charge into a can; said transfer means comprising an axially displaceable piston, means for driving said piston in a to and fro motion, and piston oscillating means driven from said drive means for oscillating said piston around its axis; wherein said piston oscillating means includes a disc mounted on a rotatable shaft, a cam track in said disc, a roller carried by a rider and engaging said track, a rod hinged to said rider, the other end of said rod being swivelly connected to a projection on the base of said piston, whereby said rotatable shaft is driven by a cam shaft carrying a cam to impart said to and fro axial motion to the piston.

3. An apparatus of the type for feeding fish into a container comprising means for forming a charge of fish in the shape of the container, and transfer means for moving the formed charge of fish into the container, said transfer means including a reciprocating transfer piston movable through a transfer stroke and a withdrawal stroke, said piston having a fish contacting surface and a longitudinal axis and being reciprocated in a direction parallel to said longitudinal axis between a fish receiving position and a transfer position, wherein the improvement comprises means for oscillating said piston about its longitudinal axis only when said piston approaches the end of its transfer stroke and begins its withdrawal stroke for utilizing rotative momentum imparted to the fish charge for breaking adhesion between said fish contacting surface and the charge of fish.

4. An apparatus for feeding fish into a container comprising a knife shaft, a rotary knife secured to said shaft and having a relieved fish receiving portion and a large diameter fish cutting portion, means for feeding fish fillet to said knife and through said relieved portion whereby said knife severs sections from the fillet, means for forming the severed sections of fish into a charge of fish in the shape of the container, means for moving the container into position to receive said charge of fish, a driven shaft, drive means interconnecting said knife shaft and said driven shaft, a transfer piston having a fish contacting surface and a longitudinal axis mounted for reciprocable movement in a direction parallel to said longitudinal axis between a fish receiving position and a transfer position, a reciprocating cam connected to said driven shaft, first linkage means interconnecting said first shaft and said piston for reciprocating said piston between said fish receiving and said transfer position, an oscillating cam connected to said knife shaft, and oscillating linkage means interconnecting said oscillating cam with said piston for causing said piston to oscillate when said fish contacting surface is in contact with the charge of fish.

5. An apparatus according to claim 4 wherein said oscillating linkage means is eccentrically connected to said piston for pivotable movement about a plane parallel to said axis and also about a plane perpendicular to said axis.

6. An apparatus according to claim 4 wherein said oscillating cam is arranged to oscillate said piston relative to the charge at least during the initial portion of the return stroke of said piston from said transfer position.

7. In a method for canning fish including inserting a fish charge into a container by a piston comprising the steps of severing sections of fish, forming the severed sections of fish into a charge of fish slightly smaller than but shaped to be accommodated within a container, and axially displacing said charge of fish into a container by means of axially reciprocating the piston, the improvement comprising the step of imparting a single oscillating movement of the piston about its reciprocating axis only when said fish charge approaches full displacement into the container and when said piston begins its withdrawal movement to break adhesion of said fish charge to said piston, and to release said charge of fish while substantially retaining its formed dimensions.

* * * * *